May 4, 1965

L. T. KINCANNON 3,181,518

ENGINE

Filed Jan. 4, 1963

INVENTOR.
LEO T. KINCANNON
BY
Wheeler, Wheeler & Wheeler
ATTORNEYS.

May 4, 1965 L. T. KINCANNON 3,181,518
ENGINE
Filed Jan. 4, 1963 2 Sheets-Sheet 2
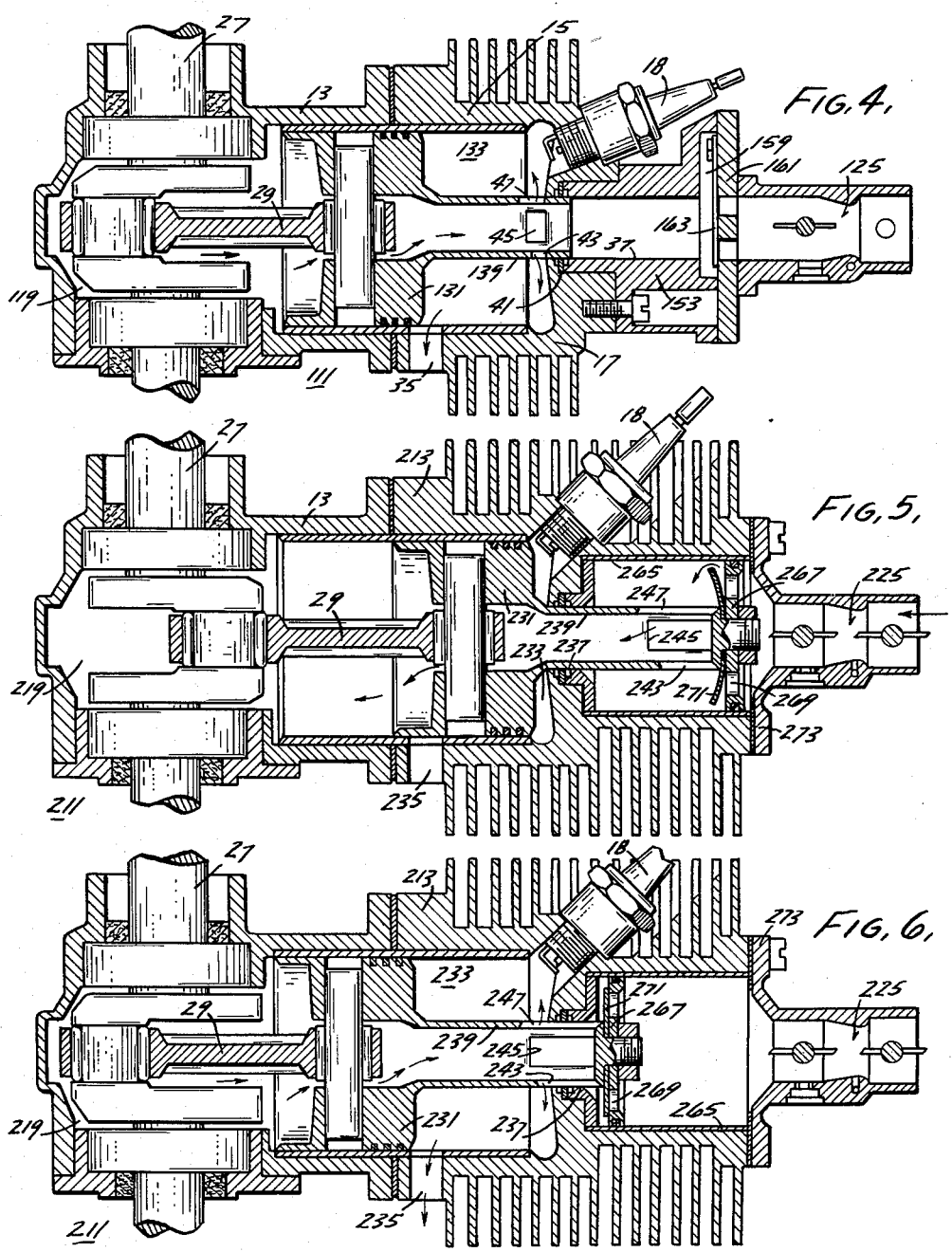
INVENTOR.
LEO T. KINCANNON
BY
Wheeler, Wheeler & Wheeler
ATTORNEYS.

United States Patent Office 3,181,518
Patented May 4, 1965

3,181,518
ENGINE
Leo T. Kincannon, Milwaukee, Wis., assignor to Outboard Marine Corporation, Waukegan, Ill., a corporation of Delaware
Filed Jan. 4, 1963, Ser. No. 249,365
3 Claims. (Cl. 123—73)

The invention relates generally to internal combustion engines. More particularly, the invention relates to two-stroke internal combustion engines in which combustion air is pumped through a crankcase into the combustion chamber in response to piston travel and in which scavenging of the burnt fuel-air mixture occurs when the piston is adjacent to bottom dead center.

The invention is embodied in an engine which conventionally includes a cylinder having a generally closed head end, a piston reciprocable axially within said cylinder and defining, with said cylinder, a combustion chamber of variable volume, and an exhaust port in the wall of said cylinder located so as to be open when the piston is adjacent to bottom dead center. The invention provides, in combination with the above conventional features, an intake port which is opened by piston movement as the piston approaches bottom dead center and which is located so as to discharge combustion air or a combustion air-fuel mixture into the head end of the combustion chamber. Resultant gas flow in the cylinder therefore takes place along a direction extending generally from the head end of the cylinder to the exhaust port, thereby effectively scavenging the cylinder while reducing the quantity of air-fuel mixture which was commonly exhausted in previous two-stroke engine arrangements.

In one embodiment of the invention, the cylinder includes an opening at the head end thereof, and the piston includes a hollow tube or neck which projects from the face of the piston, which communicates through a bore in the piston with the crankcase, and which extends through said opening in gas-tight relation thereto. The tubular neck includes a combustion air supply port located so as to be open to the combustion chamber for gas flow from the crankcase to the cylinder only when the piston is adjacent to bottom dead center. Admission of air to the crankcase is provided by a conventional reed valve arrangement mounted on the crankcase.

In another embodiment, the tubular neck has an end which communicates with means, connected to the head end of the cylinder, for forming a chamber which, in turn, communicates with a reed valve arrangement for supplying combustion air or a combustion air-fuel mixture through the hollow neck and thereby also to the crankcase and, eventually, to the combustion chamber.

In still another embodiment of the invention, there is attached to the head end of the cylinder an auxiliary or super-charging cylinder. Movable axially within the auxiliary cylinder is an auxiliary piston which is fixed to the outer end of the tubular neck in closing relation thereto. Carried by the auxiliary piston is a reed valve arrangement which permits entry of combustion air or combustion air-fuel mixture into the auxiliary cylinder. From the auxiliary cylinder, the combustion air flows through a supply port in the neck and through the neck into the crankcase during movement of the main piston from bottom dead center to top dead center position. During movement of the main piston from top dead center to bottom dead center position, the reed valve arrangement prevents escape of gas from the auxiliary cylinder and from the crankcase as the gas in the auxiliary cylinder is forced into the crankcase to increase the pressure therein. When the main piston approaches bottom dead center position, the combustion air supply port comes into communication with the combustion chamber, thereby supplying the combustion chamber with a new charge. As in the other embodiments, the entering charge flows from the head end of the cylinder to the opposing face of the piston to exhaust the burnt gases.

In each of the three embodiments, if the exhaust arrangement for the cylinder consists of only a single port or of a series of ports located substantially along only one side of the engine, then the combustion air supply port arrangement in the neck is preferably disposed to afford initial entry of the incoming charge into the combustion chamber in a lateral direction away from the side of the cylinder containing the exhaust port or ports. As a result, the side of the cylinder opposite the exhaust port is scavenged slightly earlier than the remainder of the cylinder, thereby avoiding any possibility of entrapping a quantity of burnt gas along the side wall of the cylinder opposite the side wall of the cylinder containing the exhaust ports.

Other objects and advantages of the invention will become known by reference to the following descriptions and accompanying drawings of the three embodiments of the invention.

In the drawings:

FIGURE 4 is a view similar to FIGURE 3 with the piston shown adjacent to its bottom dead center position;

FIGURE 5 is a view, partially in section, of a third engine embodiment which incorporates various of the features of the invention and which is shown with the piston adjacent to its top dead center position; and FIGURE 6 is a view similar to FIGURE 5 showing the piston adjacent to its bottom dead center position.

Figure 1:
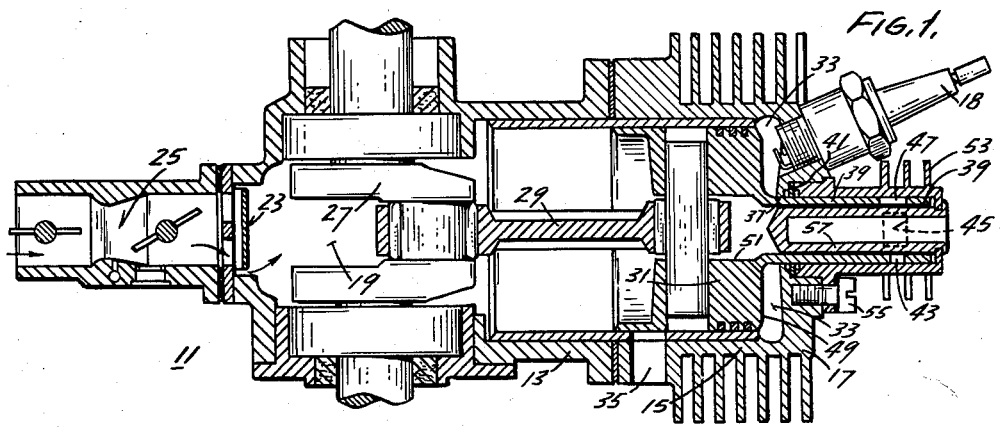
FIGURE 1 is a view, partially in section, of a first engine embodiment which incorporates various of the features of the invention and which is shown with the piston adjacent to top dead center.
Figure 2:
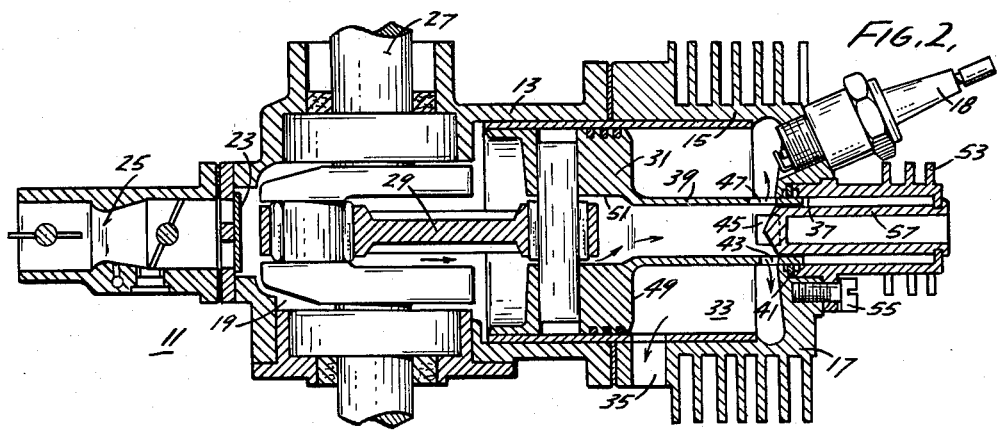
FIGURE 2 is a view similar to FIGURE 1 with the piston shown adjacent to bottom dead center.

The engine 11 shown in FIGURE 1 is representative of either a single cylinder engine or a multiple cylinder engine having a separate crankcase for each cylinder. The engine 11 includes a cylinder block including a cylinder 15 which has a head 17 with a spark plug 18 mounted therein. At its other end, the cylinder 15 communicates with a crankcase case 19 which is closed or gas tight, except for valve means in the form of a reed valve 23 for admitting combustion air or a combustion air-fuel mixture from a suitable source, such as for example, a carburetor 25. Such reed valves are conventional and function to permit gas flow into the crankcase when the pressure therein is below exterior pressure and to prevent gaseous back flow when the pressure in the crankcase is higher than exterior pressure. Passing through the crankcase 19 is a crankshaft 27 which is pivotally connected to a rod 29 which, in turn, is pivotally connected to a piston 31. The piston 31 is reciprocable axially within the cylinder 15 between bottom dead center and top dead center positions and, together with the cylinder, defines a combustion chamber 33 of variable volume.

The cylinder 15 is also provided with exhaust port means located to provide communication with the combustion chamber 33 when the piston 31 is at or adjacent to bottom dead center. The exhaust means can comprise a series of ports circumferentially spaced around the periphery of the cylinder 15 and, in the disclosed construction, comprises a single exhaust port 35.

Combustion air or a combustion air-fuel mixture is supplied to the combustion chamber 33 in a manner providing gaseous flow from the head end 17 of the cylinder to the exhaust port 35 by means including, in part, an opening 37 in the head end 17 of the cylinder 15, and a hollow neck or tube 39 which passes through the opening 37 in gas-tight relation thereto. The gas-tight seal between the tubular neck and the head end of the cylinder is provided by means in the form of a packing or piston ring 41. The tubular neck is reciprocable with the piston 31 and includes combustion air supply port means located so as to come into communication with the combustion chamber 33 only when the piston is at or adjacent to bottom dead center.

The combustion air supply port means can include a single port and, in the disclosed construction, includes a series of four circumferentially arranged ports, only three of which are illustrated, i.e., ports 43, 45 and 47. In order to avoid entrapment of burnt gases on the side of the cylinder 15 opposite from the exhaust port 35, the combustion air supply means is arranged so that the port 47, disposed on the more remote side of the tubular neck 39 from the exhaust port 35, is closest to the piston 31 and therefore comes into communication with the combustion chamber 33 before the other supply ports as the piston 31 approaches bottom dead center. As a result, scavenging of the combustion chamber 33 takes place initially along the side of the combustion chamber remote from the exhaust port 35.

While various arrangements can be employed to establish communication between the tubular neck 39 and the crankcase 19 and to effect reciprocation of the tubular neck 39 with the piston 31, in the disclosed construction, the tubular neck 39 extends from the face 49 of the piston 31 and communicates with a bore 51 extending through the piston 31 into communication with the crankcase 19.

Various means can be employed to prevent escape of gas out of the outer end of the tubular neck 39. In the disclosed construction, a cap or extension 53 is employed. More specifically, the cap 53 can be secured to the head 17 of the cylinder around the opening 37 by various means, such as for example, the illustrated bolts 55. Preferably, the cap 53 also serves to fix the location of the piston ring or packing 41. In order to decrease the total volume of the crankcase 19 and connected gas passages, particularly when the piston 31 is adjacent to bottom dead center, the cap 53 includes a stud or plug 57 which projects into the open, outer end of the hollow neck 39.

In operation, when the piston 31 is at top dead center, the gas in the extended crankcase volume (including the adjacent portion of the cylinder) is at a pressure lower than the exterior pressure. Consequently, combustion air or combustion air-fuel mixture is drawn into the crankcase 19 through the reed valve 23. As the piston 31 moves from top dead center to bottom dead center through the power stroke, the gases in the crankcase are compressed, thereby effecting closure of the reed valve 23 when the pressure within the crankcase 19 exceeds the exterior pressure. As the piston 31 approaches bottom dead center, the exhaust port 35 is first opened, followed by successive exposure or opening of the combustion air supply ports 47, 45, and 43 to the combustion chamber 33. Because of the increased pressure condition in the crankcase 19, combustion air flows into the combustion chamber 33 at the head end, sweeping the burnt gases out through the exhaust port 35.

During the compression stroke, i.e., during piston movement from a bottom dead center to top dead center, the combustion air supply ports and the exhaust port are closed off from the combustion chamber 33 and a pressure condition less than the exterior pressure condition is created in the crankcase 19, thereby drawing in combustion air through the reed valve 23.

In the embodiment shown in FIGURES 3 and 4, the engine 111 is generally of similar construction to the engine 11, except as specified hereinafter. More specifically, the crankcase 119 is not provided with a reed valve, such as the reed valve 23, for controlling the inflow of combustion air. Instead, the cap 153 terminates with an open chamber 159 which is closed by a plate 161 incorporating a reed valve 163 for controlling combustion air flow into the chamber 159 from a connected carburetor 125 or other combustion air source. The reed valve 163 is conventional and functions in the same manner as the reed valve 23 disclosed with respect to the engine 11.

Apart from the location of the reed valve 163, the operation of the engine 111 is the same as the operation of the engine 11, except that combustion air flows to the crankcase 119 through the hollow neck 139 as well as from the crankcase 119 through the hollow neck 139 to the combustion chamber 133 when the piston 131 is adjacent bottom dead center.

In the embodiment shown in FIGURES 5 and 6, the engine 211 is generally of a construction similar to that of the engine 111, except as disclosed hereinafter. More specifically, the cylinder block 213 includes an auxiliary or super-charging cylinder 265 which communicates with the opening 237 and in which the outer end of the hollow neck 239 is reciprocable. Carried by the hollow neck 239 in closing relation to its outer end is an auxiliary piston 267 which wipes the auxiliary cylinder 265. The auxiliary piston 267 carries a reed valve arrangement including one or more ports 269 and a reed valve member 271 mounted on the auxiliary piston 267 for movement relative to the ports 269 in the conventional manner. The open outer end of the auxiliary cylinder 265 is closed by a cover 273 which communicates with a carburetor 225 or other source of combustion air. As in the previously described embodiments, the combustion air supply ports 243, 245, and 247 are arranged for communication with the combustion chamber 233 only when the piston 231 is adjacent to bottom dead center. However, the combustion air supply ports 243, 245, and 247 are also proportioned so as to be continually in communication with the auxiliary super-charging cylinder 265.

Figure 3:
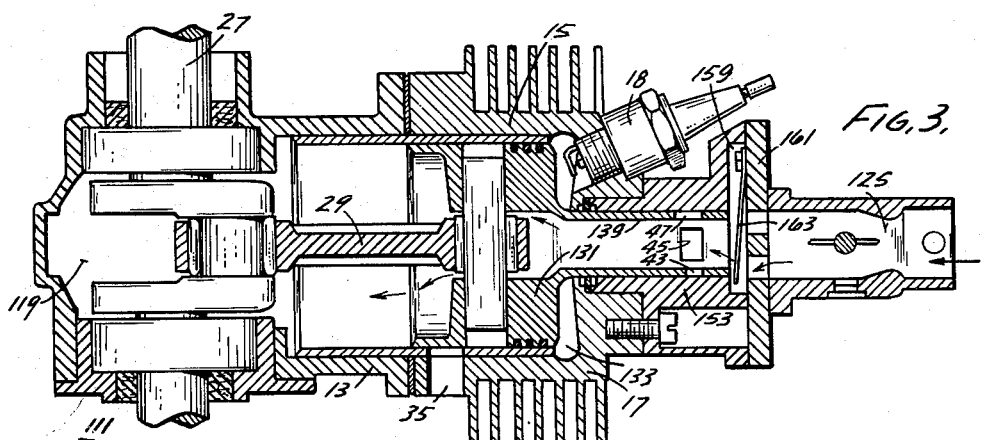
FIGURE 3 is a view, partially in section, of a second engine embodiment which incorporates various of the features of the invention and which is shown with the piston adjacent to its top dead center position.

The operation of the engine 211 shown in FIGURES 5 and 6 is substantially the same as the operation of the engine 111 shown in FIGURES 3 and 4, except that movement of the auxiliary piston 267 within the auxiliary super-charging cylinder 265 serves to increase the weight or mass of combustion air delivered to the combustion chamber 233 for each two piston strokes thereby permitting burning of a greater quantity of fuel and increased power output.

Each of the disclosed embodiments provides for flow of the incoming charge from the head end of the cylinder toward the bottom of the cylinder adjacent to the piston when the piston is located at bottom dead center. As a consequence, effective scavenging is obtained with minimum loss of unburned combustion air or combustion air-fuel mixture through the exhaust port. In addition, combustion air supply ports are located with respect to the exhaust ports so as to effectively prevent entrapment of burnt gases along the side cylinder walls opposite from the exhaust ports. Still further, the adjacent relationship of the combustion air supply ports to the spark plugs permits operation at low power levels with the introduction of less than a full charge necessary to effect complete scavenging of the combustion chamber. This advantage is achieved because the incoming charge is supplied immediately to the spark plug and is available for ignition, notwithstanding that complete exhaustion of the burnt remains of the previous charge has not been effected.

In addition, it should be noted that all ports are closed during the compression stroke, notwithstanding that the point of admission of the incoming combustion air charge is at the head end of the cylinder. Further, the incoming charge is supplied to the combustion chamber at the hottest part of the cylinder, thereby obtaining a maximum cooling effect. Still further, the incoming charge is supplied when it is at maximum compression and when the burnt gases in the combustion chamber offer minimum back pressure because of the position of the piston adjacent to bottom dead center.

Various of the features of the invention are set forth in the following claims.

What is claimed is:

1. An internal combustion engine comprising an engine block including a first cylinder having an opening at the head end thereof, a crankcase communicating with the other end of said first cylinder and a second cylinder communicating with said opening and adapted to be connected to a source of combustion air, a crankshaft journaled in said crankcase, a main piston connected to said crankshaft and movable axially within said first cylinder between a top dead center position adjacent to said head end and a bottom dead center position, thereby defining a combustion chamber of variable volume, said main piston having a face in opposed relation to said head end of said first cylinder and a bore extending from said face in communication with said crankcase, means defining an exhaust port spaced from the head end of said first cylinder in position to be in communication with said combustion chamber when said main piston is adjacent to said bottom dead center position and to be closed when said main piston is substantially spaced from said bottom dead center position, a hollow neck projecting from said face in communication with said bore and passing in fluid-tight relation through said opening at the head end of said first cylinder into said second cylinder, said neck being closed at the outer end thereof and having, in spaced relation to said piston face, means defining a combustion air supply port located so as to be in communication with said combustion chamber when said main piston is adjacent to said bottom dead center position, and to be out of communication with said combustion chamber and in communication with said second cylinder when said piston is substantially spaced from said top dead center position, a second piston mounted on said neck and movable axially within said second cylinder in accordance with movement of said main piston in said first cylinder, and means on said second piston including a port and a valve member for admitting combustion air into said second cylinder during movement of said main piston toward said top dead center position and for preventing back flow of combustion air through said port during movement of said main piston toward said bottom dead center position.

2. An internal combustion engine comprising a cylinder having an opening at the head end thereof, a hollow extension projecting from said cylinder head, a crankcase communicating with the other end of said cylinder, a piston movable axially within said cylinder between a top dead center position adjacent to said cylinder head end and a bottom dead center position to define a combustion chamber of variable volume, said piston having a face with a bore therethrough, a hollow neck projecting from said piston face in communication with said bore and passing through said opening at the head end of said cylinder in fluid-tight relation thereto and in telescopic relation to said hollow extension, said neck having in spaced relation to said piston face means defining a supply port located so as to be in communication with said combustion chamber when said piston is adjacent to said bottom dead center position, and to be out of communication with said combustion chamber when said piston is substantially spaced from said bottom dead center position, means on one of said neck and said extension and in communication with said crankcase for admitting combustion air to said crankcase, said means admitting combustion air to said crankcase including a reed valve preventing escape of combustion air from said crankcase during travel of said piston toward bottom dead center and permitting entry of air into said crankcase during travel of said piston toward top dead center, and means in the side of said cylinder defining an exhaust port spaced from the head end of said cylinder in position to be in communication with said combustion chamber when said piston is adjacent to said bottom dead center position, and to be closed when said piston is substantially spaced from said bottom dead center position.

3. An internal combustion engine comprising a cylinder having an opening at the head end thereof, a crankcase communicating with the other end of said cylinder, a piston movable axially within said cylinder between a top dead center position adjacent to said cylinder head end and a bottom dead center position to define a combustion chamber of variable volume, said piston having a face with a bore therethrough, means communicating with said crankcase for admitting combustion air to said crankcase during movement of said piston toward said top dead center position and for preventing back flow of combustion air during movement of said piston toward said bottom dead center position, means in the side of said cylinder defining an exhaust port spaced from the head end of said cylinder in position to be in communication with said combustion chamber when said piston is adjacent to said bottom dead center position, and to be closed when said piston is substantially spaced from said bottom dead center position, and a hollow neck projecting from said piston face in communication with said bore and passing through said opening at the head end of said cylinder in fluid-tight relation thereto, said neck having in spaced relation to said piston face means defining a plurality of supply ports located so as to be in communication with said combustion chamber when said piston is adjacent to said bottom dead center position, and to be out of communication with said combustion chamber when said piston is substantially spaced from said bottom dead center position, said supply ports being arranged circumferentially around said neck and including at least one supply port in the side of said neck remote from said exhaust port, and another supply port in a side of said neck less remote from said exhaust port, said one supply port being located closer to said piston face than said other supply port.

References Cited by the Examiner

UNITED STATES PATENTS

| 585,651 | 7/97 | Burger | 123—73 |
| 871,319 | 11/07 | Bissell | 123—73 |
| 1,229,216 | 6/17 | Boyd | 123—73 |
| 1,234,314 | 7/17 | Eighmie | 123—73 |
| 1,240,980 | 9/17 | Juengst | 123—73 |
| 1,354,667 | 10/20 | Lawler | 123—73 |

FOREIGN PATENTS

| 190,598 | 12/22 | Great Britain. |
| 306,174 | 2/29 | Great Britain. |

FRED E. ENGELTHALER, *Primary Examiner.*